United States Patent [19]
Yasar

[11] 3,893,215
[45] July 8, 1975

[54] METHOD OF MANUFACTURING FACE PLATES WITH LARGE NUMBER OF CONDUCTING PATHS FROM ONE FACE TO THE OTHER

[75] Inventor: Tugrul Yasar, Madison Heights, Mich.

[73] Assignee: The Bendix Corporation, North Hollywood, Calif.

[22] Filed: July 18, 1973

[21] Appl. No.: 380,517

[52] U.S. Cl. ................ 29/25.35; 29/25.14; 29/625; 117/212; 310/8.9; 313/369
[51] Int. Cl. .............................................. B01j 17/00
[58] Field of Search ............. 29/25.17, 25.14, 25.35, 29/625; 313/369; 310/8.9; 174/68.5; 117/212

[56] References Cited

UNITED STATES PATENTS

| | | | |
|---|---|---|---|
| 3,140,528 | 7/1964 | Hildebrand, Jr. et al. | 29/25.14 |
| 3,325,881 | 6/1967 | Engelking | 29/625 |
| 3,436,819 | 4/1969 | Lunine | 29/625 X |
| 3,622,825 | 11/1971 | Bennett | 313/369 |

*Primary Examiner*—Carl E. Hall
*Attorney, Agent, or Firm*—Robert C. Smith; William F. Thornton

[57] ABSTRACT

A face plate suitable for uses with an acoustical-optical image tube is disclosed and its method of manufacture. A fused glass capillary array which constitutes a disk having a large number of smooth parallel passages or pores therethrough is metalized, preferably by an electroless plating process, whereby the inside surfaces of all the pores are coated. The resulting layer of gold, silver or platinum may then be increased, if desired, by further plating, after which the disk is cleaned, heated to approximately 470° C. and the pores filled with a sealant such as silver chloride. One or both surfaces may then be lapped to provide a disk having a glass surface but with many conducting cylinders extending therethrough. If it is desired to fill the rings to make circular contacts, the sealant may be etched back from the surface and additional metal added within the rings through a further electroplating process, after which the surface or surfaces may again be lapped. If it is desired that the conductors project out of the surface, the plating steps may be continued to build up the contacts to a desired height.

9 Claims, 5 Drawing Figures

PATENTED JUL 8 1975 3,893,215

SHEET 2

METHOD OF MANUFACTURING FACE PLATES WITH LARGE NUMBER OF CONDUCTING PATHS FROM ONE FACE TO THE OTHER

BACKGROUND OF THE INVENTION

The theory relating to acoustical imaging devices teaches that the point of optimum resolution of an acoustical-optical image tube is at or just below the fundamental resonant frequency of the acoustically active plate or face of the tube. The minimum distance between image points is directly proportional to the acoustical frequency. Thus it follows that for high resolution higher frequencies with shorter sound wave lengths must be used. Thus the resonant acoustic plate must also be thinner for use with the higher frequencies, and this produces some problems since the mechanical strength of the plate decreases as it gets thinner, thus setting a limit to the resolution and to the area of the acoustical plate. It has been found possible to support the plate at some points to increase its mechanical strength and prevent its bending toward the vacuum side by using mechanical supports. Another technique which has been tried to prevent mechanical failure of the front plate is to employ pressure equalizers in front of the plate. Still another method employs a spherically bent front plate with built-in extra strength against the deflection due to the pressure differential. With this latter technique, larger area plates can be used, which means more resolution elements (picture elements) per tube face plate.

A somewhat better approach to this problem involves a tube face made of glass with many conduction metal pins extending through from inside to outside. Such tubes may be somewhat similar to cathode ray tubes in that they have an evacuated chamber for which the inside of the tube face forms a wall. The metal pin arrangement is vacuum-leakproof due to glass-to-metal seals at each pin. A typical arrangement of pins would include three per millimeter. The piezoelectric plate is laid on the front plate of the tube or spaced therefrom and is thus outside of the tube. This design separates the acoustically active part and the vacuum-tight face place functionally from each other. The acoustical piezoelectric plate does not carry an atmospheric pressure load; thus, it does not bend as it would if it were also the vacuum front window. Also, it does not have to go through the bake-out cycles which the tube itself goes through. Its size, thickness, composition, etc. are not determined or dictated by the vacuum practices followed in the construction of the tube. It is a somewhat independent item which is cemented or otherwise fastened to the front of the face of the finished tube.

It has been proposed to make tubes of this type with as many as 100 wires per square millimeter. This obviously would provide high resolution but at a cost in complexity of structure.

SUMMARY OF THE INVENTION

A structure having somewhat the same electrical-acoustical properties as that discussed above may be manufactured more conveniently and less expensively by using a technique devised by applicant. There are commercially available fused glass capillary arrays made of soda lime or borosilicate glass matrices. These arrays are made by slicing wafers or disks from a bundle consisting of a very large number of glass capillary tubes, the walls of which have been fused together with a glass matrix between the tubes into a rigid structure under heat and pressure. Wafers or disks sliced from such a bundle have certain desirable characteristics. All the capillary pores through a disk are smooth, polished and uniform in diameter through the thickness of the disk. Also, the pores are parallel to an exacting degree. The open area of a disk consisting of pores in specified inside diameter sizes will usually vary between 30 percent and 55 percent, although they may be made with more or less open area. A disk formed with this technique and having 50 percent open area has essentially the same mechanical strength as a solid piece of glass. The pores through such disks typically will have desired specified inside diameter sizes from 2 to 100 microns.

Applicant has determined that disks or plates can conveniently be from 30 to 250 pore diameters thick. Such plates or disks are then metalized such that open areas are coated by metals such as gold, copper, or nickel, including the inner walls of the pores. This coating can be achieved by electroless plating with forced flow of plating solution through the holes. Electroless plating is followed by further electroless plating or by electrolytic plating to increase the thickness of the deposition. After the pores are covered with a sufficient thickness of metal, the plates are cleaned, dried and heated to 470° C. At this temperature AgCl (silver chloride) or other suitable sealant is forced to fill the pores by applied pressure. If silver chloride is used as a sealant, the last metal deposited on the glass capillary array must be a precious metal such as gold, silver or platinum. Silver chloride is a very low vapor pressure material suitable to use in bakeable ultra high vacuum systems. It melts at 457.5° C. and wets most materials and does not chemically attack precious metals such as gold, silver and platinum. It has some plasticity to accommodate variations in thermal expansion of joining materials. It forms ultra high vacuum seals of great reliability, and the seals may be exposed to temperatures of 375° C. or more without damage. The plates can be cleaned and lapped on both sides after filling the pores with silver chloride.

The silver chloride is inert and acts only as a sealant; it does not conduct. The faces of the plate can be further processed by evaporating patterns or dots on it. The surface of the plates can be processed such that circular dots rather than rings of gold show on the surface. This can be achieved by back-etching the silver chloride from both faces (using $NH_4OH$ solution, for example) and then filling the back-etched depressions with evaporated metal, followed by lapping. If metallic spots are required to be raised above the surface, electroplating may be used.

When such a plate has been completed, the front or atmospheric pressure side of the plate may be coated by a thin film piezoelectric material which can be deposited, for example, by vacuum deposition.

DESCRIPTION OF THE PREFERRED EMBODIMENT

Figure 1:
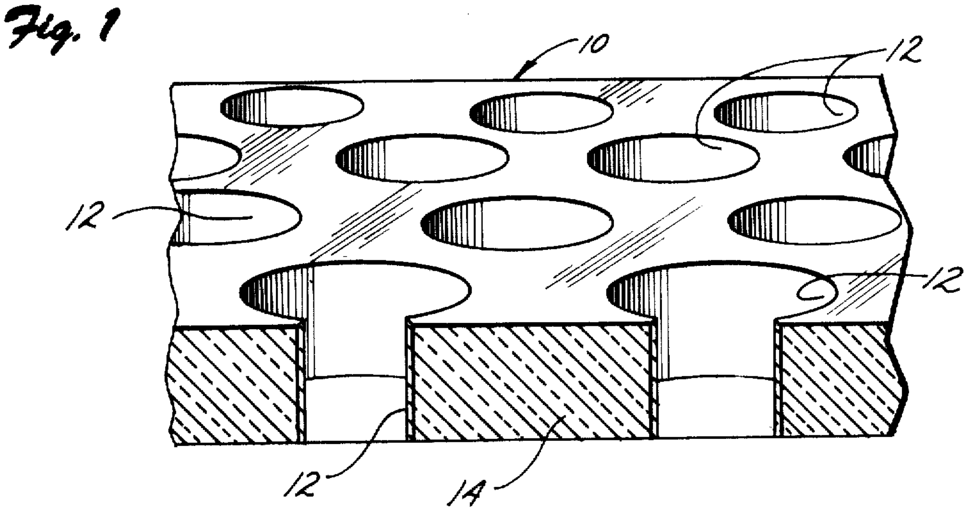
FIG. 1 is a cross-section of a typical fused glass capillary disk of a type which is generally available in the open market for precision scientific filtration applications.

A portion of a fused glass capillary disk is shown in perspective and partly in section in FIG. 1. The disk 10 consists of a very large number of short glass tubes which have been formed from a bundle of longer tubes and then cut to a desired thickness. These tubes 12 are smooth, polished and uniform in diameter throughout the thickness of the disk. Between the individual tubes is a support matrix 14, also of glass material such as soda lime matrix or borosilicate matrix.

Figure 2:
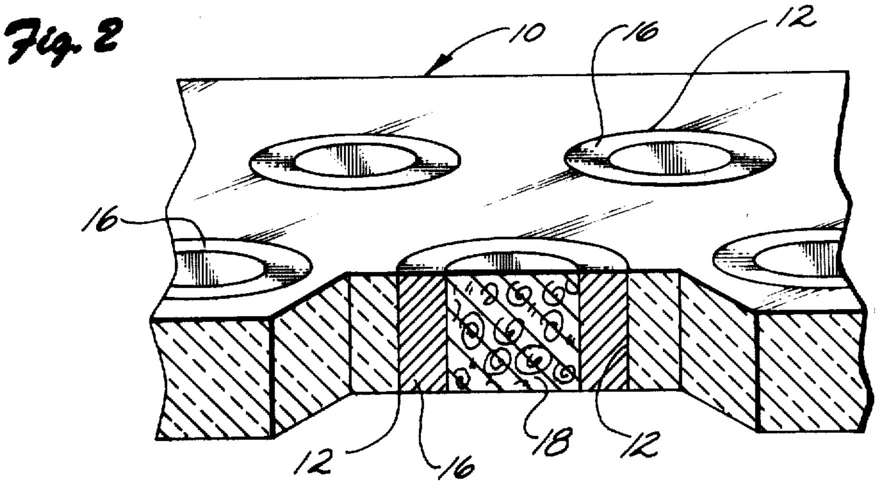
FIG. 2 is a cross-sectional view of the device of FIG. 1 after the disk has been metalized, the holes filled with sealant, and the surfaces lapped.

The glass disk 10 is then subjected to a metalizing process wherein the inner walls of the pores are coated by metal, such as gold, copper and nickel, to a desired thickness as shown at numeral 16. In order to get this metal layer to the desired thickness, a layer deposited by electroless plating is followed by additional layers deposited by electroless plating or electrolytic plating of the deposition. After the pores are coated with a sufficient thickness of metal, the plates are cleaned, dried and heated to 470° C. At this temperature a core of silver chloride or other suitable sealant 18 is forced into the pores by means of applied pressure. The plate is then preferably lapped and cleaned on both sides, after which it appears as shown in FIG. 2. Whether lapping is actually required on one or both surfaces depends on the need for a smooth surface. If the surface after the sealant is applied is such that adequate contact and conduction is provided without lapping, this step may be eliminated.

If it is desired that the pattern of metallic members on the surface of the glass plate appear as circular dots rather than rings, this can be achieved by back-etching the silver chloride from both faces and then filling the back-etched depressions with evaporated metal, after which the surface may again be lapped. The resulting structure then appears as shown in FIG. 3 with the additional evaporated metal fused directly into the metal on the side walls of the pores creating surfaces as shown at 20 and 22.

Figure 3:
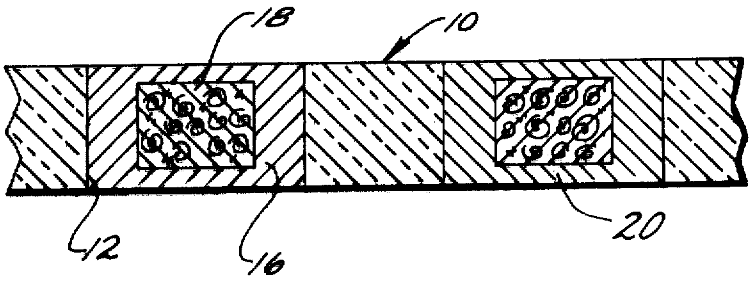
FIG. 3 is a cross-section of a plate similar to FIG. 2 but wherein the sealant has been back-etched from both faces and the depressions filled with evaporated metal and both surfaces of the plate lapped smooth.
Figure 4:
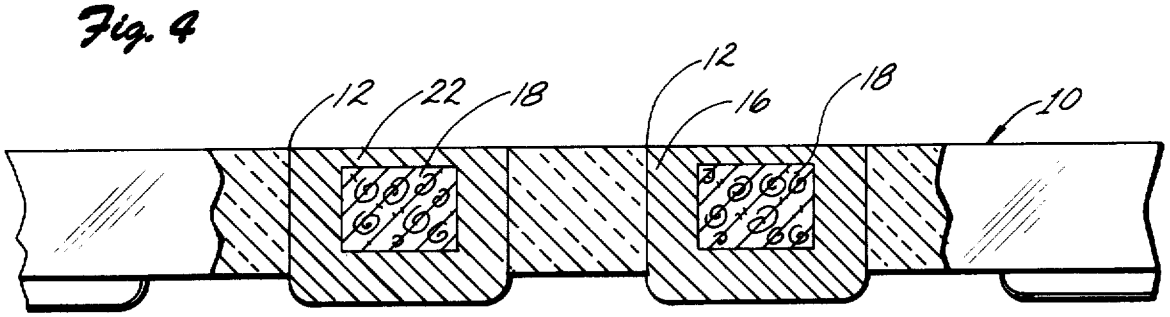
FIG. 4 is a cross-sectional view of a plate like that of FIG. 3 but in which metallic spots have been raised from the surface through electroplating.

In some applications it may be desired that the dots be increased to the point where metallic spots or buttons are raised above the surface of the disk, and this may be accomplished by electroplating more material on the surface of a disk processed as shown in FIG. 3. Such a disk appears in FIG. 4 with raised spots as shown at numerals 24. If desired, both surfaces can be provided with such raised metallic contacts.

Figure 5:
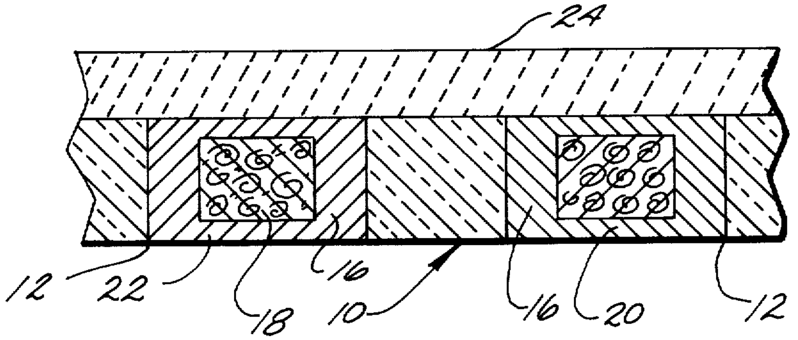
FIG. 5 is a cross-section of a plate similar to that of FIG. 3 but including a film of piezoelectric material deposited on one surface.

FIG. 5 is a cross-sectional view of a disk similar to that shown in FIG. 3 wherein the external surface of plate 10 is covered by a thin film piezoelectric material 24 which can be deposited, for example, by vacuum deposition. Typical piezoelectric materials which are used are zinc oxide or cadmium sulfide. Such materials could not otherwise be used in an acoustical-image converter (due to a lack of large-area crystals, mechanical limitations of thin films, etc.), but can be used herein as thin films, continuous or mosaic structure on top of the conducting paths in glass. Such a structure can then operate at much higher frequencies than previously possible.

In addition to the aforementioned cost advantage of the structure described above, resolutions higher than that obtained with metal wire, glass seal type of construction can be obtained. This resolution can be increased to higher than 100 lines per millimeter.

A somewhat lower temperature version of the above described face plate may be achieved by using indium cores in place of silver chloride. Since indium is conducting and has good wetting properties, the electroless plating step may not be required if good wetting of the pores can be achieved under capillary conditions, depending somewhat upon pore diameters used.

Another alternative method of metalizing the pores of the glass capillary array is to immerse the capillary disk in a solution of gold (or platinum) salts and organic compounds such as a proprietary product of Engelhard Industries, Inc., Hanovia Division, called Liquid Bright Gold (or Liquid Bright Platinum), making sure that the pores are soaked. The disk is then placed in a furnace to drive off the organic compounds, leaving the gold or platinum plating on the inside surfaces of the pores. The pores are then sealed with AgCl or other suitable sealant as before.

I claim:

1. A method of manufacturing a face plate having a large number of conducting paths thereacross comprising forming a disk of fused glass capillary arrays to a desired thickness, said disk having a large number of parallel pores extending from one face to the other, depositing a layer of metal on said disk such that the inner walls of said pores are coated with metal, cleaning and drying said disk, heating said disk to approximately 470° C. and filling the coated pores with an inert sealant material capable of maintaining sealing integrity at temperatures over 300° C., and lapping the surfaces of said disk to provide a smooth glass surface with exposed metal contacts.

2. A method of manufacturing a face plate as set forth in claim 1 wherein said metal layer is deposited on said disk and into said pores by electroless plating.

3. A method of manufacturing a face plate as set forth in claim 2 wherein additional metal is plated on said metal layer to increase its thickness.

4. A method of manufacturing a face plate having a large number of conducting paths thereacross comprising forming a disk of fused glass capillary arrays to a desired thickness, said disk having a large number of parallel pores extending from one face to the other, metalizing said disk by electroless plating techniques such that a layer of metal is deposited with forced flow of plating solution through said pores, electrolytically plating said disk to increase the thickness of said metal layer, cleaning and drying said disk, heating to approximately 470° C. and filling said pores with silver chloride, and lapping and cleaning both sides to provide a smooth surface with exposed metal contacts.

5. A method of manufacturing a face plate as set forth in claim 4 wherein said silver chloride is etched back from the surface on at least one side of said disk, the depression thus formed is filled with evaporated metal, and the surface is lapped to form a smooth circular contact area at the location of each pore.

6. A method of manufacturing a face plate as set forth in claim 5 wherein a further layer of metal is electroplated on said circular contact areas.

7. A method of manufacturing a face plate as set forth in claim 4 wherein a layer of piezoelectric material is deposited on one side of said disk.

8. A method of manufacturing a face plate as set forth in claim 7 wherein said piezoelectric material is zinc oxide.

9. A method of manufacturing a face plate as set forth in claim 7 wherein said piezoelectric material is cadmium sulfide.

* * * * *